United States Patent [19]

Meunier

[11] Patent Number: 5,780,733
[45] Date of Patent: Jul. 14, 1998

[54] TIRE COLD STATE DETECTION AND MONITORING METHODS

[75] Inventor: André Meunier, Lempdes, France

[73] Assignee: Compagnie Generale des Etablissments Michelin-Michelin & CIE, Clermont-Ferrand Cedex, France

[21] Appl. No.: 806,449

[22] Filed: Feb. 26, 1997

[30] Foreign Application Priority Data

Mar. 6, 1996 [FR] France .................................. 96 03004

[51] Int. Cl.$^6$ .................................................. B60C 23/02
[52] U.S. Cl. .................................................. 73/146.2
[58] Field of Search ........................ 73/146, 146.2, 73/146.3, 146.5, 146.8; 340/441, 442, 443, 444, 445, 448, 449, 557; 364/424.03, 424.04, 558, 565, 571.07; 152/415, 416, 417

[56] References Cited

U.S. PATENT DOCUMENTS

| | | | |
|---|---|---|---|
| 4,909,074 | 3/1990 | Gerresheim et al. | 73/146.4 |
| 5,228,337 | 7/1993 | Sharpe et al. | 73/146.5 |
| 5,274,355 | 12/1993 | Galan | 340/445 |
| 5,473,938 | 12/1995 | Handfield et al. | 73/146.5 |
| 5,569,848 | 10/1996 | Sharp | 73/146.2 |

FOREIGN PATENT DOCUMENTS 2680136  2/1993  France.

*Primary Examiner*—William L. Oen
*Attorney, Agent, or Firm*—Baker & Botts, L.L.P.

[57] ABSTRACT

A method of processing signals in a system for the monitoring of the tires of a vehicle in which the time necessary in order to obtain a cold state of the tires as a function of the previously identified conditions of use of the vehicle before it was stopped is determined. The method allows verification of the natural losses and variations in climate of the tires of the vehicle.

6 Claims, 2 Drawing Sheets

TIRE COLD STATE DETECTION AND MONITORING METHODS

BACKGROUND OF THE INVENTION

The present invention relates to systems for the monitoring of tires. It concerns the monitoring of the changes in pressure due to variations in climate or to natural losses, and in particular to the precise determination of the best conditions for effecting this monitoring.

Aside from an accidental leak, it is well known that the inflation pressure of tires varies substantially due to natural losses or variations in climate, such as the changes in outside temperature from one season to the next.

For this reason, the recommendations of the manufacturers of tires call for regular verification of the inflation pressure of the tires "once every two weeks, cold, that is to say at least one hour after the car has been stopped or after it has traveled two to three kilometers at slow speed" in the case of passenger cars (MICHELIN RED GUIDE 1996).

When a vehicle is equipped with a central system for the monitoring of the tires, how is this monitoring of the natural losses to be effected? French Patent 2 680 136 proposes considering that the state of the tires is cold when the maximum deviation between the temperatures of the air inside the tires and a reference temperature measured in the vehicle is less than 6° C. This method has the drawback of requiring at least five temperature sensors in perfect condition since any drift in measurement between the sensors can result in error in the precise determination of the cold state of the tires.

SUMMARY OF THE INVENTION

The object of the present invention is a method of processing signals in a system for the monitoring of tires of a vehicle which, in particular, permits monitoring of the natural or climate losses based on a determination of the hot or cold state of the tires, which does not present the constraints of the prior art.

As used herein, the following terms shall have the meanings stated:

"ambient temperature", the result of a measurement of the temperature of the surrounding air effected by a temperature sensor located within the vehicle;

"temperature of the environment of a tire", the result of a temperature measurement carried out by a temperature sensor located in the immediate environment of a tire, for instance, a sensor fastened to the rim or the wheel disk;

"system for the monitoring of tires", a system comprising for each tire an electronic module for measuring the inflation pressure as well as the temperature of the environment with means for transmitting the measurement signals to a central unit for the processing of such signals located within the vehicle; the central unit also receives ambient temperature measurement signals and is connected to means for alerting the driver of the vehicle; and "stop time of the monitoring system", the time elapsing between a disconnecting of the system by, for instance, the action of the driver of the vehicle on the contact key, and the restarting of the system by the opposite action on the part of the driver.

The method of the invention processes the signals of a system delivering an ambient temperature measurement and, for each tire, at least one measurement of the inflation pressure of the tire and one measurement of the temperature in the environment of the tire, and is such that:

- upon each stopping of the system, at least one environmental temperature measurement for each tire is stored in non-volatile memory;
- upon each starting of the system, the stop time of the system is compared with a critical cooling time which, in its turn, is variable as a function of the temperature values stored upon the stopping of the system;
- if the stop time is greater than or equal to the critical cooling time, a verification of the inflation pressure of the tires is effected, which is recorded in a so-called cold mode and then switched into a hot verification mode; and
- if the stop time is less than the critical cooling time, it is switched immediately into a hot verification mode.

This method of determining the cold state of the tires is therefore based on a comparison between the stop time of the system and a critical cooling time of the tires and their environments. However, the storing of the ambient and environment temperatures of the tires upon the stopping of the system makes it possible to identify whether the vehicle had been used, before stopping, under normal or severe conditions of travel, and with or without intensive braking. This identification is very advantageous since it makes it possible to adjust the length of the critical cooling time as a function of the actual conditions of travel, and thus to substantially improve the conditions for the determination of the hot or cold state.

This method can advantageously make use of the deviations between the ambient temperature and the environment temperatures of the tires stored upon the stopping of the system. The amplitude of these deviations is substantially greater than the measurement of these same deviations upon the restarting of the system. Thus, there results therefrom a determination which is more reliable and more robust than that proposed by French Patent 2 680 136.

DESCRIPTION OF THE DRAWINGS

The invention is explained by the following figures and description, given solely by way of example.

DESCRIPTION OF PREFERRED EMBODIMENTS

In its simplest embodiment, one can choose between two values of the critical cooling time as a function of the value of the maximum deviation between the ambient temperature and the different environment temperatures of the tires observed. When this maximum deviation is less than a threshold value for a given temperature, it can be considered that the conditions of travel were normal and that a time of cooling on the order of 90 minutes for a passenger car or 4 hours for a heavy vehicle is entirely satisfactory in order to obtain good thermal equilibrium between the tires and their environment.

When the maximum deviation in temperature is greater than the preceding threshold, it can be considered that it is necessary in order to obtain such thermal equilibrium substantially to increase the cooling time due to the strong heating in the environment of the tires which is observed.

The exact value of the threshold or thresholds is to be determined experimentally as a function of each vehicle and of the exact place of location of the wheel modules.

Figure 1:
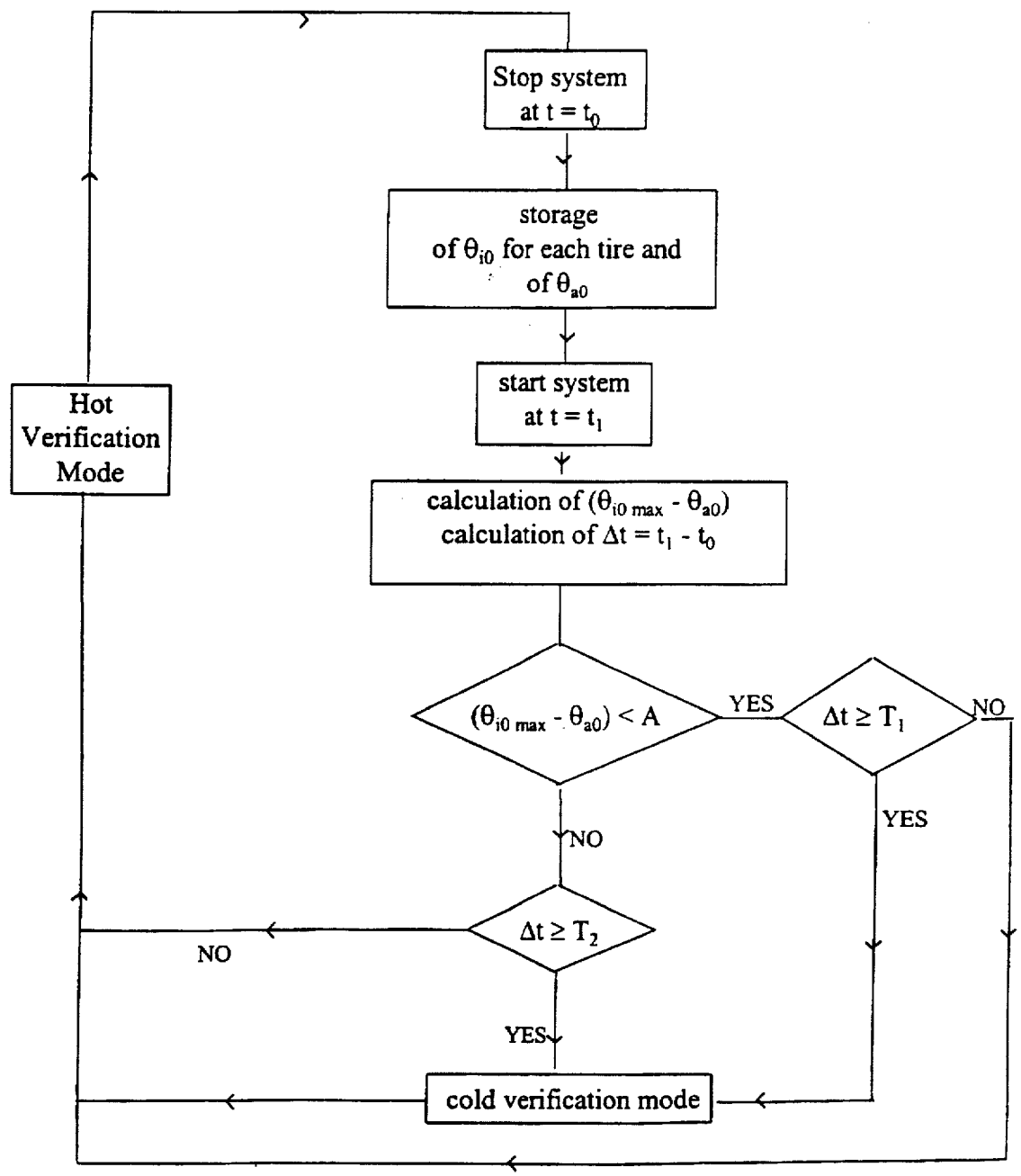
FIG. 1 is a flow chart illustrating the cold state detection method.

This simple embodiment is illustrated in the flow chart of FIG. 1. When the monitoring system stops at $t=t_0$, it stores in a non volatile memory the environmental temperature of each tire $\theta_{i0}$ and the ambient temperature $\theta_{a0}$. At the following start of the monitoring system, at $t=t_1$, it determines the maximum value of $\theta_{i0}$ stored, $\theta_{i0\,max}$ and calculates $(\theta_{i0\,max}-\theta_{a0})$ and the stop time $\Delta t=t_1-t_0$. If $(\theta_{i0\,max}-\theta_{a0})$ is less than a threshold A, then the stop time is compared with the first critical cooling time $T_1$ and if this stop time is greater than or equal to $T_1$, the system switches to the cold verification mode.

If $(\theta_{i0\,max}-\theta_{a0})$ is greater or equal to A, then the stop time is compared with the second critical cooling time $T_2$; ($T_2>T_1$) and if this stop time is greater or equal to $T_2$, the system switches to the cold verification mode. After having completed this cold verification mode, the system switches to the hot verification mode.

After having determined a cold state of the tires, the monitoring system effects a cold verification of the tires in which, at least:

the inflation pressure of each tire is measured;

the algebraic deviation between the measured inflation pressure of each tire and its rated pressure is calculated;

the average of these algebraic deviations is calculated; and an alarm is given off when the absolute value of this average exceeds a given threshold $S_1$.

This verification is advantageously supplemented by the following steps:

the value of the average algebraic deviations is stored in non-volatile memory in order to establish a series of N successive values corresponding to the last N cold verifications effected by the system; and an alarm is given off when these N values are of the same sign and the majority of them have their absolute value greater than a given threshold $S_2$.

Figure 2:
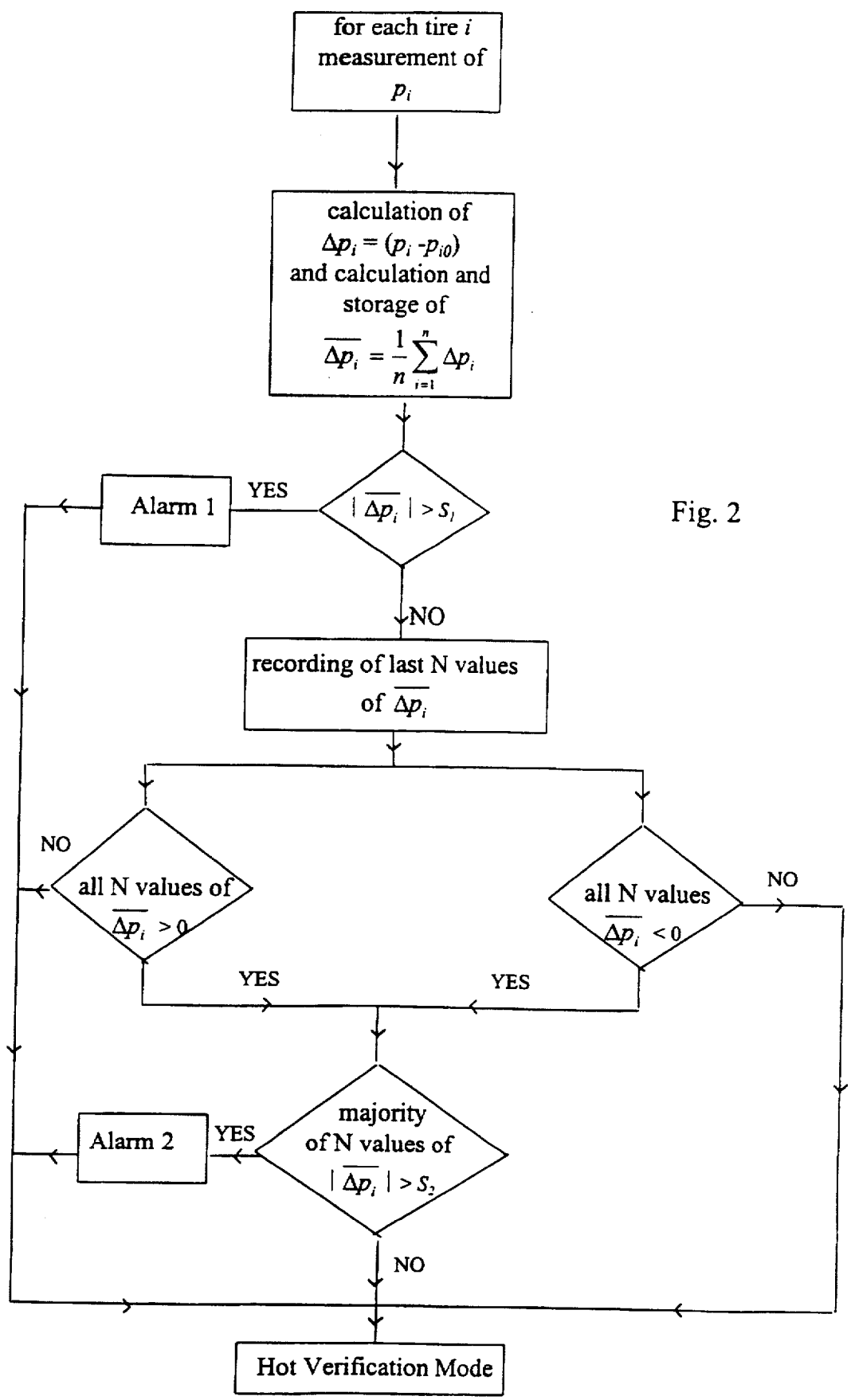
FIG. 2 is a flow chart illustrating the cold state verification method.

This cold state verification mode is illustrated in the flow chart of FIG. 2. When the system switches to the cold state verification mode, it measures the inflation pressure of each tire $p_i$. Then it calculates $\Delta p_i=(p_i-p_{i0})$, algebraic deviation between the measured inflation pressure and its rated pressure, and calculates and stores $$\overline{\Delta p_i}=\frac{1}{n}\sum_{i=1}^{n}\Delta p_i$$

the average of these algebraic deviations. It then compares $|\overline{\Delta p_i}|$ with a first threshold $S_1$, by calculation of $|\overline{\Delta p_i}|-S_1$ and gives off an alarm when the result of the comparison is positive. If the result of the comparison is negative, the system determines if the last N stored values of $\overline{\Delta p_i}$, are all positive or negative. If it is the case, then it determines if the majority of these N values have their absolute value greater than a given second threshold $S_2$. In this case the system gives off an alarm. It then switches to the hot verification mode.

In the other cases, the system switches directly to the hot verification mode.

While the inflation pressure alert thresholds, tire by tire, are on the order of 0.3 bar for passenger cars and 1 bar for heavy vehicles, the $S_1$ threshold may be further reduced to 0.2 bar and 0.8 bar, and the $S_2$ threshold even more: namely to 0.15 and 0.5 bar. This monitoring thus makes it possible to assure at all times correct inflation pressures for all of the tires. This point is particularly critical when the operating points (load/pressure) of the tires are located at the limit of the minimum pressure values required by the European Tire and Rim Technical Organization (ETRTO).

Of course, the cold verification step can also comprise conventional comparisons of the inflation pressures tire by tire as well as the monitoring of the deviations between tires on the same axle.

Finally, the hot verification of the tires advantageously comprises these same comparisons of the inflation pressures tire by tire, the monitoring of the deviations between the tires of the same axle as well as a monitoring of the variation in time of these deviations between tires of the same axle or several axles.

For the carrying out of the method of the invention, one may use a monitoring device such as that disclosed in U.S. Pat. No. 4,703,650 having an electronic module for the measurement of pressure by wheel transmitting by inductive coupling the measurement signals to a central unit arranged within the vehicle and in its turn connected to a display device in the vicinity of the driver. The disclosure of U.S. Pat. No. 4,203,650 is hereby incorporated by reference. One can also use a device which transmits the same information by radio to a similar central unit.

I claim:

1. A method of processing signals in a system for the monitoring of the tires of a vehicle, said system delivering an ambient temperature measurement and, for each tire, at least one measurement of the inflation pressure of said tire and one measurement of the temperature in the environment of said tire, in which:

(a) upon each stopping of the system, at least one ambient temperature measurement as well as one environmental temperature measurement for each tire is stored in non-volatile memory;

(b) upon each starting of the system, the stop time of the system is compared with a critical time which itself is variable as a function of the values of the temperatures stored upon the stopping of the system;

(c) if the stop time is greater than or equal to said critical time, a verification of the inflation pressure of the said tires is effected, which is recorded in a so-called cold mode and then switched into a hot verification mode; and (d) if the stop time is less than said critical time, switching is immediately effected into a hot verification mode.

2. A method according to claim 1, in which the value of the critical time is determined as a function of the deviation in ambient and environment temperatures of the tires which were stored upon the stopping of the system.

3. A method according to claim 2, in which a first given value is selected as the value of the critical time when the maximum deviation between the ambient and environment temperatures of the tires is less than a given threshold.

4. A method according to claim 3, in which a second given value, greater than the first, is selected as value of the critical time when the maximum deviation between the ambient and environment temperatures of the tires is greater than a given threshold.

5. A method according to claim 1, in which the verification of step (c) comprises at least the following steps:

(a) the inflation pressure of each tire is measured;

(b) the algebraic deviation between the measured inflation pressure of each tire and its rated pressure is calculated;

(c) the average of said algebraic deviations for all the tires is calculated; and (d) an alarm is given off when the absolute value of said average exceeds a given threshold $S_1$.

6. A method according to claim 5, in which the verification of step (c) further comprises the following steps:

(a) the value of said average is stored in non-volatile memory in order to establish a series of N successive values corresponding to the last N cold verifications effected by the system; and (b) an alarm is given off when said N values are of the same sign and a majority of them have their absolute value greater than a given threshold $S_1$.

* * * * *

UNITED STATES PATENT AND TRADEMARK OFFICE
CERTIFICATE OF CORRECTION

PATENT NO. :  5,780,733

DATED :  July 14, 1998

INVENTOR(S) :  André Meunier

It is certified that error appears in the above-identified patent and that said Letters Patent is hereby corrected as shown below:

Col. 6, line 5 "$S_1$" should read -- $S_2$ --.

Signed and Sealed this

Ninth Day of March, 1999

Attest:

Q. TODD DICKINSON

*Attesting Officer*    *Acting Commissioner of Patents and Trademarks*